(12) United States Patent
Bubolz et al.

(10) Patent No.: US 9,416,213 B2
(45) Date of Patent: *Aug. 16, 2016

(54) PROCESS FOR PRODUCING POLYCARBODIIMIDE

(71) Applicant: BASF SE, Ludwigshafen (DE)

(72) Inventors: Markus Bubolz, Luebbecke (DE); Karl Haeberle, Speyer (DE); Kai Henke, Brockum (DE); Dirk Kempfert, Stemwede-Dielingen (DE); Markus Kraemer, Lambsheim (DE); Sven Lawrenz, Ilvesheim (DE); Frank Schaefer, Stemwede Haldem (DE); Maria Thomas, Muehlen (DE); Ulrich Treuling, Bensheim (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/429,227

(22) PCT Filed: Sep. 19, 2013

(86) PCT No.: PCT/EP2013/069452
§ 371 (c)(1),
(2) Date: Mar. 18, 2015

(87) PCT Pub. No.: WO2014/044743
PCT Pub. Date: Mar. 27, 2014

(65) Prior Publication Data
US 2015/0232605 A1   Aug. 20, 2015

(30) Foreign Application Priority Data
Sep. 19, 2012   (EP) .................................... 12184995

(51) Int. Cl.
*C08G 18/00* (2006.01)
*C08G 18/02* (2006.01)
*C08G 18/08* (2006.01)
*C08G 18/09* (2006.01)

(52) U.S. Cl.
CPC .......... *C08G 18/025* (2013.01); *C08G 18/0838* (2013.01); *C08G 18/095* (2013.01)

(58) Field of Classification Search
CPC ............. C08G 18/025; C08G 18/0838; C08G 18/095; C07C 267/00
See application file for complete search history.

(56) References Cited

U.S. PATENT DOCUMENTS

| | | | |
|---|---|---|---|
| 5,008,363 A | 4/1991 | Mallon et al. | |
| 5,357,021 A | 10/1994 | Tye et al. | |
| 5,889,096 A | 3/1999 | Imashiro et al. | |
| 6,126,860 A | 10/2000 | Imashiro et al. | |
| 7,273,902 B2 | 9/2007 | Takahashi et al. | |
| 7,368,493 B2 | 5/2008 | Takahashi et al. | |
| 2008/0015294 A1 | 1/2008 | Kramer et al. | |
| 2013/0143458 A1 | 6/2013 | Avtomonov et al. | |

FOREIGN PATENT DOCUMENTS

| | | |
|---|---|---|
| DE | 10 2004 041 605 | 3/2006 |
| EP | 0 548 815 | 6/1993 |
| EP | 0 628 541 | 12/1994 |
| EP | 0 767 188 | 4/1997 |
| EP | 0 789 059 | 8/1997 |
| EP | 0 803 538 | 10/1997 |
| EP | 0 808 828 | 11/1997 |
| EP | 0 952 146 | 10/1999 |
| EP | 2 371 873 | 10/2011 |

OTHER PUBLICATIONS

U.S. Appl. No. 14/767,121, filed Aug. 11, 2015, Adams, et al.
International Search Report Issued Nov. 21, 2013 in PCT/EP13/069452 Filed Sep. 19, 2013.

*Primary Examiner* — Michael L Leonard
(74) *Attorney, Agent, or Firm* — Oblon, McClelland, Maier & Neustadt, L.L.P

(57) ABSTRACT

A process for producing a polycarbodiimide, comprising polymerizing a diisocyanate in the presence of a carbodiimidization catalyst in a reaction vessel in liquid phase at a temperature in the range of from 20 to 250° C., at a pressure in the range of from 20 to 800 mbar and in the presence of at least one inert gas, wherein the at least one inert gas is introduced into the liquid phase in the reaction vessel with a flow rate in the range of from 0.1 x/h to 100 x/h, x being the volume of the reaction vessel.

17 Claims, No Drawings

PROCESS FOR PRODUCING POLYCARBODIIMIDE

The present invention relates to a process for producing a polycarbodiimide which comprises polymerizing a diisocyanate in the presence of a carbodiimidization catalyst in a reaction vessel in liquid phase at a temperature in the range of from 20 to 250° C., at a pressure in the range of from 20 to 800 mbar and in the presence of at least one inert gas. According to the process of the invention, the at least one inert gas is introduced into the liquid phase in the reaction vessel with a flow rate in the range of from 0.1 to 100 x/h wherein x is the volume of the reaction vessel. Further, the present invention relates to a polycarbodiimide obtainable or obtained by the process according to the invention.

Polycarbodiimides are well known compounds which, for example, are used as stabilizers to prevent hydrolysis in plastics.

Such polycarbodiimides can be produced by subjecting organic diisocyanates to a decarboxylation and a polymerization reaction. In the simplest way, two diisocyanate molecules are reacted to obtain a carbodiimide.

Further polymerization may lead to oligomers with a plurality of carbodiimide groups and terminal isocyanate groups according to the following formula

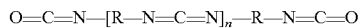

O=C=N—[R—N=C=N]$_n$—R—N=C=O wherein n is typically a number in the range of from 1 to 30.

Usually, this polymerization reaction is performed in the presence of a carbodiimidization catalyst. As carbodiimidization catalyst, an organophosphorus compound can be employed. Such organophosphorus carbodiimidization catalysts are highly active so that the condensation reaction may be performed fast and under mild conditions.

EP-A 2 371 873 discloses a carbodiimidization process wherein a diisocyanate is converted into a polycarbodiimide by using an organophosphorous carbodiimidization catalyst. The reaction is performed at a temperature of 180° C., a pressure of 500 mbar and in the presence of 200 weight ppm (wppm) catalyst. A stream of nitrogen gas is introduced at the beginning of the polymerization into the reaction mixture. The period of time during which the nitrogen gas is introduced into the reaction mixture corresponds to about one seventh of the overall polymerization time. The remainder of the reaction is performed in the absence of nitrogen. As to the amount of nitrogen introduced, and as to the question where exactly the nitrogen is introduced, EP-A 2 371 873 is silent. A polycarbodiimide with an NCO content of 5.5 to 9.5% by weight was obtained after about 14 hours, which corresponds to an average carbodiimidization degree of 4 to 7.

EP-A 0 952 146 discloses a hydrophilic dicyclohexylmethanecarbodiimide obtained by polymerization of a diisocyanate in the presence of 5,000 wppm organophosphorous carbodiimidization catalyst. It is disclosed only generally that the reaction may be performed in a current of an inert gas such as nitrogen or the like. It is not disclosed in which amount and at which position the inert gas stream is introduced into the reaction vessel. According to the examples, the reaction is performed at a temperature of 180° C. A polymer having a degree of polymerization of 4 is obtained after about 20 hours.

EP-A 0 548 815 discloses a polycarbodiimide obtained by condensation of p-tetramethylxylylene diisocyanate (TMXDI) and butyl isocyanate using about 10,000 wppm organophosphorous carbodiimidization catalyst. It is disclosed that the reaction may be performed in a current of an inert gas such as nitrogen or the like. No disclosure is contained in EP-A 0 548 815 regarding the question in which amount and at which position the inert gas stream is introduced into the reaction vessel. The reaction is performed at a temperature of 150° C. for 240 hours to obtain a polycarbodiimide having a degree of polymerization of 9. According to the specific examples, the use of an inert gas is not mentioned.

EP-A 0 767 188 discloses a polymerization reaction of an aliphatic diisocyanate using about 5000 wppm organophosphorous carbodiimidization catalyst to obtain a polycarbodiimide at a temperature of 185° C. after 10 hours. A nitrogen stream is generally mentioned, but not specifically defined. In particular, neither the specific amount of inert gas nor the position of its introduction into the reaction vessel are mentioned. The degree of polymerization of the polycarbodiimide was 3.

EP-A 0 789 059 discloses a hydrolysis stabilizer obtained by polymerization of TMXDI in the presence of about 20,000 wppm carbodiimidization catalyst. The polymerization is performed at a temperature of 185° C. in a stream of nitrogen gas. After 50 hours a polycarbodiimide with an NCO content of 0.05% by weight was obtained. As to the amount of nitrogen introduced, and as to the question where exactly the nitrogen is introduced, EP-A 0 789 059 is silent.

EP-A 0 808 828 discloses a polycarbodiimide having double bonds obtained by condensation of a polycarbodiimide in the presence of a carbodiimidization catalyst. It is contemplated in a general manner that the reaction may be carried out in a stream of inert gas such as nitrogen or the like without mentioning specific amounts and the position at which the inert gas is introduced. A polycarbodiimide starting from TMXDI is obtained by polymerization at a temperature of 185° C. for 10 hours in the presence of about 5,000 wppm carbodiimidization catalyst with a polymerization degree of 3.5. The use of an inert gas is not specifically mentioned in the examples of EP-A 0 808 828.

It was an object of the present invention to provide an improved process for the production of polycarbodiimides, wherein the desired degree of polymerization is obtained in a short period of time.

It was a further object of the present invention to provide polycarbodiimides with a low color index.

It was yet a further object of the present invention to provide polycarbodiimides with a high degree of purity.

Surprisingly, it was found that the objects could be solved by a polymerization process which is performed under specific temperature and pressure conditions wherein at least one inert gas is introduced into the liquid phase of the reaction mixture and wherein the flow rate of the inert gas through the liquid phase is in a specific range.

Therefore, the present invention relates to a process for producing a polycarbodiimide, comprising (a) polymerizing a diisocyanate in the presence of a carbodiimidization catalyst in a reaction vessel in liquid phase at a temperature in the range of from 20 to 250° C., at a pressure in the range of from 20 to 800 mbar and in the presence of at least one inert gas, wherein the at least one inert gas is introduced into the liquid phase in the reaction vessel with a flow rate in the range of from 0.1 to 100 x/h, x being the volume of the reaction vessel.

Further, the present invention relates to a polycarbodiimide which is obtainable or is obtained by the process according to the present invention.

Step (a)

Generally, the polymerization of the present invention is carried out at a temperature in the range of from 20 to 250° C. Preferably, the polymerization of the diisocyanate according to (a) is performed at a temperature in the range of from 30 to 250° C., more preferably from 50 to 240° C., more preferably from 70 to 230° C., more preferably from 100 to 220° C., more preferably from 120 to 210° C., more preferably from 130 to 200° C. More preferably, the polymerization of the diisocyanate according to (a) is performed at a temperature in the range of from 140 to 190° C., more preferably from 155 to 185° C.

It is generally conceivable that during polymerization, two or more suitable different temperatures are applied, provided that these two or more temperatures are within above-mentioned preferred ranges. Heating and/or cooling during the process may be carried out continuously, semi-continuously, or discontinuously.

The process of the present invention is performed at a reduced pressure in the range of from 20 to 800 mbar. Preferably, the process for producing a polycarbodiimide according to (a) is performed at a pressure in the range of from 40 to 700 mbar, more preferably from 60 to 650 mbar, more preferably from 100 to 600 mbar, more preferably from 150 to 550 mbar, more preferably from 200 to 500 mbar. More preferably, the polymerization of the diisocyanate according to (a) is performed at a pressure in the range of from 200 to 400 mbar, more preferably from 150 to 350 mbar.

It is generally conceivable that during polymerization, two or more suitable different pressures are applied, provided that these two or more pressures are within above-mentioned preferred ranges. Increasing or decreasing the pressure during the process may be carried out continuously, semi-continuously, or discontinuously.

According to the present invention, the polymerization of diisocyanate to polycarbodiimide is performed in a stream of at least one inert gas, wherein the at least one inert gas is introduced into the liquid phase in the reaction vessel with a flow rate in the range of from 0.1 to 100 x/h, x being the volume of the reaction vessel. According to preferred embodiments of the present invention, the polymerization is performed in a stream of at least one inert gas, wherein the at least one inert gas is introduced into the liquid phase in the reaction vessel with a flow rate in the range of from 0.2 to 80 x/h, more preferably from 0.3 to 60 x/h, more preferably from 0.4 to 40 x/h, more preferably from 0.45 to 30 x/h, more preferably from 0.5 to 25 x/h, x being the volume of the reaction vessel. More preferably, the flow rate is in the range of from 1 to 20 x/h, more preferably from 2 to 15 x/h.

Preferably, the present invention relates to a process comprising polymerizing a diisocyanate in the presence of a carbodiimidization catalyst in a reaction vessel in liquid phase at a temperature in the range of from 130 to 200° C., at a pressure in the range of from 200 to 500 mbar and in the presence of at least one inert gas, wherein the at least one inert gas is introduced into the liquid phase in the reaction vessel with a flow rate in the range of 0.2 x/h to 80 x/h, x being the volume of the reaction vessel.

Preferably, the present invention relates to a process comprising polymerizing a diisocyanate in the presence of a carbodiimidization catalyst in a reaction vessel in liquid phase at a temperature in the range of from 130 to 200° C., at a pressure in the range of from 200 to 500 mbar and in the presence of at least one inert gas, wherein the at least one inert gas is introduced into the liquid phase in the reaction vessel with a flow rate in the range of 0.3 x/h to 60 x/h, x being the volume of the reaction vessel.

Preferably, the present invention relates to a process comprising polymerizing a diisocyanate in the presence of a carbodiimidization catalyst in a reaction vessel in liquid phase at a temperature in the range of from 130 to 200° C., at a pressure in the range of from 200 to 500 mbar and in the presence of at least one inert gas, wherein the at least one inert gas is introduced into the liquid phase in the reaction vessel with a flow rate in the range of 0.4 x/h to 40 x/h, x being the volume of the reaction vessel.

Therefore, according to a particularly preferred embodiment, the present invention relates to a process comprising polymerizing a diisocyanate in the presence of a carbodiimidization catalyst in a reaction vessel in liquid phase at a temperature in the range of from 130 to 200° C., at a pressure in the range of from 200 to 500 mbar and in the presence of at least one inert gas, wherein the at least one inert gas is introduced into the liquid phase in the reaction vessel with a flow rate in the range of 0.5 x/h to 25 x/h, x being the volume of the reaction vessel.

Preferably, the present invention relates to a process comprising polymerizing a diisocyanate in the presence of a carbodiimidization catalyst in a reaction vessel in liquid phase at a temperature in the range of from 140 to 190° C., at a pressure in the range of from 200 to 400 mbar and in the presence of at least one inert gas, wherein the at least one inert gas is introduced into the liquid phase in the reaction vessel with a flow rate in the range of 1 x/h to 20 x/h, x being the volume of the reaction vessel.

Preferably, the present invention relates to a process comprising polymerizing a diisocyanate in the presence of a carbodiimidization catalyst in a reaction vessel in liquid phase at a temperature in the range of from 155 to 185° C., at a pressure in the range of from 150 to 350 mbar and in the presence of at least one inert gas, wherein the at least one inert gas is introduced into the liquid phase in the reaction vessel with a flow rate in the range of 2 x/h to 15 x/h, x being the volume of the reaction vessel.

It is generally conceivable that during polymerization, two or more suitable different flow rates of the at least one inert gas are applied, provided that these two or more flow rates are within above-mentioned preferred ranges. Increasing or decreasing the flow rates during the process may be carried out continuously, semi-continuously, or discontinuously.

The term "flow rate of at least one inert gas" as used according to the present invention relates to the sum of the flow rates of all inert gases. If, for example, two different inert gases are introduced simultaneously, the flow rate is the flow rate of the first inert gas plus the flow rate of the second inert gas. Generally, it is conceivable that two or more different inert gases are introduced simultaneously and/or consecutively.

The term "inert gas" as used in this context of the present invention refers to a gas which does not, or not essentially, interact unfavorably with the starting materials, any intermediate products or reaction products in the reaction mixture. Preferably, the inert gas can be any gas as far as it is inert or essentially inert towards the diisocyanate, the carbodiimidization catalyst and the polycarbodiimide. More preferably, the inert gas is selected from the group consisting of nitrogen, helium, neon, argon, carbon dioxide, and a mixture of two or more these gases. More preferably, one single inert gas is used. More preferably, this inert gas is nitrogen. Therefore, the present invention relates to a process for producing a polycarbodiimide, comprising:

(a) polymerizing a diisocyanate in the presence of a carbodiimidization catalyst in a reaction vessel in liquid phase at a temperature in the range of from 20 to 250° C., at a pressure in the range of from 20 to 800 mbar and in the presence of an inert gas, preferably nitrogen, wherein the inert gas is introduced into the liquid phase in the reaction vessel with a flow rate in the range of from 0.1 x/h to 100 x/h, x being the volume of the reaction vessel.

The inert gas can in principle originate from any suitable source. For example, it is possible to use a suitable offgas produced by a suitable process. Thus, the polymerization process of the present invention may be suitably combined with other processes.

According to the present invention, the at least one inert gas is introduced into the liquid phase of the reaction mixture which is present in the reaction vessel. Generally, the precise position at which the at least one inert gas is introduced into the liquid phase is not critical as long it is introduced below the liquid level. Most preferably, the position at which the at least one inert gas is introduced into the liquid phase is designed so that the at least one inert gas is introduced below the liquid level for at least 90%, more preferably at least 95%, more preferably at least 99% such as 100% of the overall reaction time. Therefore, the inlet of the at least inert gas is maintained below the liquid level even during stirring of the reaction mixture and/or after volume reduction due to the removal of the $CO_2$ byproduct.

The means via which the at least one inert gas is introduced can be chosen according to the specific needs. Specifically, the at least one inert gas is introduced via an immersion pipe, an aeration stirrer, a bottom inlet, a side inlet, or a gasing ring. Preferably, a gasing ring is used. More preferably, a gasing ring is used which at least partially, preferably completely exhibits downwardly oriented openings. A combination of two or more of these means can be used. Generally, it is conceivable to introduce the at least one inert gas at different positions into the liquid phase depending, for example, on the size of the reaction vessel or the like. In this case, the term "flow rate of the at least one inert gas" as used according to the present invention relates to the sum over all flow rates of the individual streams introduced into the reaction vessel at a given point in time.

Preferably, the at least one inert gas is introduced into the liquid phase of the reaction mixture at a pressure in the range of from 0.5 to 200 bar, preferably of 0.5 to 100 bar, more preferably of 0.5 to 10 bar.

Preferably, the at least one inert gas is introduced into the liquid phase of the reaction mixture with a temperature in the range of from 20 to 200° C., preferably of 20 to 150° C., more preferably of 20 to 120° C.

Generally, the period of time during which the at least one inert gas is introduced into the liquid phase below the liquid level can be adjusted to the specific needs of the process. Preferably, the at least one inert gas is introduced into the liquid phase for a period of time of at least 50%, more preferably at least 75%, more preferably of at least 90% of the overall reaction time.

More preferably, the at least one inert gas is introduced for a period of time in the range of from 90 to 100%, more preferably of from 95 to 100% of the overall reaction time.

It is further preferred that at the beginning of the reaction the at least one inert gas is introduced at a reduced flow rate and the flow rate is increased at a later stage of the reaction. By way of example, the at least one inert gas is introduced at a flow rate in the range of from 0.2 x/h to 40 x/h, preferably from 0.5 x/h to 20 x/h, more preferably from 1 x/h to 20 x/h during the first 10 to 50%, preferably 10 to 40%, more preferably 10 to 30% of the overall reaction time, and the flow rate is increased to a value in the range of from 0.2 x/h to 80 x/h, preferably from 0.5 x/h to 25 x/h, more preferably from 1 x/h to 20 x/h after that period time, wherein the value of the flow rate introduced the later stage of the reaction is higher than the flow rate introduced at the beginning of the reaction.

Surprisingly, it was found that introducing the stream of the at least one inert gas below the liquid level during the polymerization reaction has a particular positive effect on the reaction time. By introducing the stream of inert gas below the liquid level during the polymerization reaction, the reaction time after which a specific polymerization degree is achieved can be decreased.

Further, it is conceivable that in addition to the at least one inert gas introduced into the liquid phase, at least one further inert gas is introduced into the reaction vessel above the liquid level of the reaction mixture. In this case, the at least one inert gas introduced above the liquid level can be identical to or different from at least one inter gas introduced into the liquid phase.

The reaction vessel which can be used for the polymerization of a diisocyanate in the presence of a carbodiimidization catalyst according to (a) is not subjected to any particular restrictions. The reaction vessel may a reactor made of a material selected from the group consisting of stainless steel or glass. Suitably, the reactor is equipped with heating means, stirring means, cooling means, vacuum means, at least one inert gas inlet and at least one gas outlet, which may be individually controlled, and the like. The volume of the reactor is not critical and is chosen dependent of the amount of educts used for the polymerization. By way of example, suitable volumes of the reaction vessel are in the range of from 0.5 to 20,000 liter, preferably from 1 to 15,000 liter, more preferably from 50 to 10,000 liter.

Generally, the polymerization of the present invention can be carried out continuously or semi-continuously. Preferably, the polymerization of the present invention is performed in batch mode.

In the process of the present invention, a wide range of diisocyanates may be used as starting material. Further, it is conceivable that a mixture of two or more different diisocyanates is used. Preferred diisocyanates are diisocyanates of the formula $R(NCO)_2$, wherein R is selected from the group consisting of linear or branched aliphatic $C_3$-$C_{15}$ hydrocarbon residues, cycloaliphatic $C_5$-$C_{20}$ hydrocarbon residues, aryl $C_6$-$C_{18}$ hydrocarbon residues, alkaryl $C_6$-$C_{20}$ hydrocarbon residues, and aralkyl $C_6$-$C_{20}$ hydrocarbon residues.

Specific diisocyanates which may be used for the production of polycarbodiimides according to the process of the present invention are diisocyanates selected from the group consisting of methylene diisocyanate, dimethylene diisocyanate, trimethylene diisocyanate, tetramethylene diisocyanate, pentamethylene diisocyanate, dipropylether diisocyanate, 2,2-dimethylpentane diisocyanate, 3-methoxyhexane diisocyanate, octamethylene diisocyanate, 2,2,4-trimethylpentane diisocyanate, nonamethylene diisocyanate, decamethylene diisocyanate, 3-butoxyhexane diisocyanate, 1,4-butylene glycol dipropylether diisocyanate, thiodihexyl diisocyanate, metaxylylene diisocyanate, paraxylylene diisocyanate, 4,4'-dicyclohexylmethane diisocyanate (HMDI), 1,3-bis(2-isocyanato-2-propyl)benzene (TMXDI), toluene diisocyanate (TDI), diphenylmethane diisocyanate (MDI), isophorone diisocyanate (IPDI), hexamethylene diisocyanate (HDI) and 1,12-diisocyanatododecane (DDI). As mentioned above, it is conceivable that two or more of these diisocyanates can be used.

More preferred diisocyanates which may be used for the production of polycarbodiimides according to the process of the present invention are diisocyanates selected from the group consisting of tetramethylene diisocyanate, hexamethylene diisocyanate (HDI), dodecamethylene diisocyanate, 1,4-diisocyanatocyclohexane, trimethylhexane diisocyanate, 2,2-bis(4-isocyanatocyclohexyl)-propane, isophorone diisocyanate (IPDI), 4,4'-dicyclohexylmethane diisocyanate (HMDI), 1,3-bis(2-isocyanato-2-propyl)benzene (TMXDI), toluene diisocyanate (TDI) and diphenylmethane diisocyanate (MDI). As mentioned above, it is conceivable that two or more of these diisocyanates can be used.

In a particularly preferred embodiment, one single diisocyanate is used. More preferably, this diisocyanate is 1,3-bis (2-isocyanato-2-propyl)benzene (TMXDI).

Preferably, the carbodiimidization catalyst comprises at least an organophosphorous compound selected from the group consisting of phospholenes, phospholene oxides, phospholines, Phospholine oxides and mixtures of two or more thereof. In addition to the at least one organophosphorous compound, the carbodiimidization catalyst may contain at least one further component which may either be catalytically active or essentially inert under polymerization conditions. More preferably, the carbodiimidization catalyst comprises, preferably consists of an organophosphorous compound selected from the group consisting of phospholene oxides and mixtures of two or more phospholene oxides. More preferably, the carbodiimidization catalyst comprises, preferably consists of a phospholene oxide.

In particular, the carbodiimidization catalyst comprises, preferably consists of, a phospholene oxide of the general formula (1) and double bond isomers thereof,

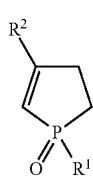

(1)

wherein $R^1$ and $R^2$ are independently H or a suitably substituted or unsubstituted aliphatic $C_1$-$C_{15}$ hydrocarbon residue, cycloaliphatic $C_5$-$C_{15}$ hydrocarbon residue, aryl $C_6$-$C_{15}$ hydrocarbon residue, aralkyl $C_6$-$C_{15}$ hydrocarbon residue, or alkaryl $C_6$-$C_{15}$ hydrocarbon residue, more preferably H or a $C_1$-$C_{10}$ hydrocarbon residue.

Preferably, $R^1$ is H or a substituted or unsubstituted aliphatic $C_1$-$C_{10}$ hydrocarbon residue, or aryl $C_6$-$C_{15}$ hydrocarbon residue. More preferably, $R^1$ is a substituted or unsubstituted methyl, ethyl or propyl or a substituted or unsubstituted phenyl or benzyl. More preferably, $R^1$ is methyl or phenyl.

Preferably, $R^2$ is H or a substituted or unsubstituted aliphatic $C_1$-$C_{10}$ hydrocarbon residue. More preferably, $R^2$ is H or a substituted or unsubstituted methyl, ethyl or propyl. More preferably, $R^2$ is H or methyl.

Examples of the phospholene oxides include 3-methyl-1-phenyl-2-phospholene-1-oxide, 1-phenyl-2-phospholene-1-oxide, 1-methyl-2-phospholene-1-oxide, 1,3-dimethyl-2-phospholene-1-oxide, 1-ethyl-3-methyl-2-phospholene-1-oxide and double bond isomers thereof.

Further suitable carbodiimidization catalysts may comprise, preferably consist of, an organophosphorus compound selected from the group consisting of diphenylphosphinic acid and salts thereof, bis-(2,4,-trimethylpentyl)-phosphinic acid, tributylphosphane, triisobutylphosphane sulfide, trialkylphosphane oxides such as trioctylphosphane oxide or trihexylphosphane oxide, triphenylphosphane, tetraphenylphosphine bromide, tetrabutylphosphine chloride, tetrabutylphosphine bromide, bis(2,4,4-trimethylpentyl)-dithiophosphonic acid, bis(2,4,4-trimethylpentyl)-monothiophosphonic acid, and mixtures of two or more thereof.

Preferably, the carbodiimidization catalyst comprises, preferably consists of, 1-methyl-2-phospholene-1-oxide (MPO).

Preferably, at the beginning of the polymerization, the concentration of the carbodiimidization catalyst, defined as amount carbodiimidization catalyst relative to the amount of diisocyanate, is in the range of from 100 to 20,000 weight ppm (wppm), preferably from 1,000 to 10,000 wppm, more preferably from 2,000 to 6,000 wppm.

Generally, the diisocyanate can be polymerized in the presence of at least one suitable solvent which is also inert or essentially inert under the reaction conditions. By way of example, suitable solvents are aromatic hydrocarbons such as toluene, xylene and the like, amides such as N-methylpyrrolidone, dimethylformamide, dimethylacetamide and the like, halogenated hydrocarbons, such as dichloromethane, chloroform, dichloroethane, tetrachloroethane and the like, ethers such as tetrahydrofuran (THF) and the like, and cyclic carbonates, such as ethylene carbonate, propylene carbonate and the like.

According to a preferred embodiment of the present invention, the diisocyanate is polymerized according to (a) in the absence of a solvent.

It is preferred that the polycarbodiimide prepared according to the process of the present invention in step (a) has a degree of polymerization in the range of from 1 to 20, preferably from 2 to 15, more preferably from 3 to 12, more preferably from 3 to 10. With the process of the present invention the desired degree of polymerization is achieved particularly fast. The degree of the polymerization of the polycarbodiimide obtained can be determined by measuring the amount of the remaining isocyanate groups by a titration method.

According to a preferred embodiment of the present invention, the polycarbodiimide obtained by the process of the present invention has an NCO content in the range of from 0 to 25% by weight, preferably from 1 to 18% by weight, more preferably from 2 to 15% by weight, based on the total weight of the polycarbodiimide. More preferably, the polycarbodiimide obtained by the process of the present invention has an NCO content in the range of from 3 to 12% by weight, more preferably from 4 to 10% by weight, based on the total weight of the polycarbodiimide.

In particular, in case TMXDI is used as starting material, a polymerization degree of 12.8 corresponds to an NCO content of about 3% by weight.

As mentioned above, it was found that the polymerization conditions according to step (a) of then present invention allow a comparatively short polymerization time. In particular, it was found that the desired NCO content as described above is achieved after a polymerization time in the range of from 1 to 30 hours, preferably from 1 to 20 hours, more preferably from 1 to 10 hours. Most preferably, it was found that the desired NCO content as described above is achieved after a polymerization time in the range of from 1 to 30 h, more preferably from 1 to 20 h.

Therefore, the present invention also relates to above-described process, wherein after a polymerization time in the range of from 1 to 30 hours, preferably from 1 to 20 hours, more preferably from 1 to 10 hours, the polycarbodiimide obtained has an NCO content in the range of from 0 to 25% by weight, preferably from 1 to 18% by weight, more preferably from 2 to 15% by weight, based on the total weight of the polycarbodiimide.

According to the process of the present invention, a clear and light-colored polycarbodiimide is preferably obtained. The polycarbodiimide obtained according to the process of the present invention can therefore suitably be used as a stabilizer which does not unfavorably impair the optical appearance of plastics. In a preferred embodiment, the polycarbodiimide has a color index of at most 20, preferably of at most 10, preferably of at most 5. The color index of the polycarbodiimide of the present invention is to be understood as being determined according to DIN 6162 (iodine color index), a low color index value indicating a clear and light-colored polycarbodiimide of excellent quality.

Therefore, the present invention also relates to a polycarbodiimide, preferably obtainable or obtained by the process according to the present invention, having an NCO content in the range of from 0 to 25% by weight, preferably from 1 to 18% by weight, more preferably from 2 to 15% by weight, based on the total weight of the polycarbodiimide. More preferably, the present invention also relates to a polycarbodiimide, preferably obtainable or obtained by the process according to the present invention, having an NCO content in the range of from 6 to 12% by weight, based on the total weight of the polycarbodiimide.

Further, the present invention relates to a polycarbodiimide, preferably obtainable or obtained by the process according to the present invention, having a color index of at most 20, preferably of at most 10, more preferably of at most 5, as determined according to DIN 6162.

Yet further, the present invention relates to a polycarbodiimide, preferably obtainable or obtained by the process according to the present invention, having an NCO content in the range of from 0 to 25% by weight, preferably from 1 to 18% by weight, more preferably from 2 to 15% by weight, based on the total weight of the polycarbodiimide and having a color index of at most 20, preferably of at most 10, more preferably of at most 5, as determined according to DIN 6162.

Preferably, the weight ratio of carbodiimidization catalyst relative to the polycarbodiimide in the mixture obtained from (a) is in the range of from 0.01:100 to 2:100, preferably from 0.02:100 to 1:100, more preferably from 0.02:100 to 0.5:100, more preferably from 0.02:100 to 0.25:100.

Generally, the weight ratio of diisocyanate relative to polycarbodiimide in the mixture obtained from (a) may be in the range of from 0:100 to 1,000:100. Preferably, the weight ratio of diisocyanate relative to polycarbodiimide in the mixture obtained from (a) is in the range of from 1:100 to 1,000:100, more preferably from 1:100 to 500:100, more preferably from 1:100 to 100:100.

Preferably, at least 90% by weight, more preferably at least 95% by weight, more preferably at least 99 by weight of the mixture according to (a) consist of polycarbodiimide, carbodiimidization catalyst, and optionally diisocyanate.

Within above-defined limits, the mixture obtained from (a) may comprise further components which may be removed at least partially in the further steps discussed below, for example as one or more separate distillation fractions. Further components may be for example by-products and/or side-products obtained after polymerization of diisocyanate in the presence of carbodiimidization catalyst.

Further Steps

According to a preferred embodiment of the present invention, the reaction mixture comprising polycarbodiimide and being obtained by the polymerization according to step (a) is subjected to purification, for example purification comprising distillation. Preferably, a purification method is applied which may contain 1, 2 or more distillation stages, preferably 2 or more distillation stages, more preferably exactly 2 distillation stages. Yet further, it is preferred that between at least two distillation stages, a suitable entrainer is added, which, even more preferably, has a boiling point which is lower than the boiling point of the polycarbodiimide.

More preferably, the reaction mixture obtained from step (a) of the process of the present invention is subjected to a:

1. Method for the purification of a polycarbodiimide comprising
   (b) separating carbodiimidization catalyst from the polycarbodiimide by subjecting the reaction mixture obtained from (a) to a first distillation, wherein a first bottom product and a first top product are obtained, wherein the first bottom product comprises the polycarbodiimide and carbodiimidization catalyst, wherein the weight ratio of carbodiimidization catalyst relative to polycarbodiimide in the first bottom product is lower than the weight ratio of carbodiimidization catalyst relative to polycarbodiimide in the mixture according to (a), and wherein the first top product comprises carbodiimidization catalyst;
   (c) adding an entrainer to the first bottom product obtained from (b) to obtain a mixture, wherein the entrainer has a boiling point which is lower than the boiling point of the polycarbodiimide;
   (d) further separating the carbodiimidization catalyst from the polycarbodiimide by subjecting the mixture obtained from (c) to a second distillation, wherein a second bottom product and a second top product are obtained, wherein the second bottom product comprises the polycarbodiimide and the carbodiimidization catalyst, wherein the weight ratio of carbodiimidization catalyst relative to polycarbodiimide in the second bottom product is lower than the weight ratio of carbodiimidization catalyst relative to polycarbodiimide in the first bottom product obtained from (b), and wherein the second top product comprises carbodiimidization catalyst and entrainer.

This preferred purification method of the present invention comprising steps (b), (c) and (d) is further characterized by the following specific embodiments and the combinations of embodiments resulting from the respective back-references and combinations of back-references:

2. The process according to embodiment 1, wherein the weight ratio of carbodiimidization catalyst relative to polycarbodiimide in the bottom product obtained from (b) is at most 2:100,000, preferably at most 1:100,000, more preferably at most 0.5:100,000, more preferably at most 0.2:100,000, more preferably in the range of from 0.01:100,000 to 2:100,000, more preferably from 0.1:100,000 to 1:100,000, more preferably from 0.2:100,000 to 0.5:100,000.

3. The process according to embodiment 1 or 2, wherein the weight ratio of carbodiimidization catalyst relative to polycarbodiimide in the bottom product obtained from (d) is at most 0.2:100,000, preferably at most 0.15 to 100,000, more preferably at most 0.1:100,000.

4. The process according to any of embodiments 1 to 3, wherein the entrainer added in (c) has a boiling point in the range of from 150 to 350° C. at ambient pressure.

5. The process according to any of embodiments 1 to 4, wherein the entrainer added in (c) does not comprise an aminic —NH— group and/or an —OH group and/or an —SH group and/or a —COOH group.

6. The process according to any of embodiments 1 to 5, wherein the entrainer added in (c) is a diisocyanate.

7. The process according to any of embodiments 1 to 6, wherein the entrainer added in (c) has the formula $R(NCO)_2$, wherein R is selected from the group consisting of linear or branched aliphatic $C_3$-$C_{15}$ hydrocarbon residues, cycloaliphatic $C_5$-$C_{20}$ hydrocarbon residues, aryl $C_6$-$C_{18}$ hydrocarbon residues, alkaryl $C_6$-$C_{20}$ hydrocarbon residues, and aralkyl $C_6$-$C_{20}$ hydrocarbon residues.

8. The process according to any of embodiments 1 to 7, wherein the entrainer added in (c) is 1,3-bis(2-isocyanato-2-propyl)benzene (TMXDI).
9. The process according to any of embodiments 1 to 8, wherein the mixture obtained from step (a) further comprises a diisocyanate, wherein in (b) the diisocyanate is at least partially separated from the polycarbodiimide and the first top product obtained from (b) further comprises diisocyanate.
10. The process according to embodiment 9, wherein the diisocyanate has the formula $R(NCO)_2$, wherein R is selected from the group consisting of linear or branched aliphatic $C_3$-$C_{15}$ hydrocarbon residues, cycloaliphatic $C_5$-$C_{20}$ hydrocarbon residues, aryl $C_6$-$C_{18}$ hydrocarbon residues, alkaryl $C_6$-$C_{20}$ hydrocarbon residues, and aralkyl $C_6$-$C_{20}$ hydrocarbon residues.
11. The process according to embodiment 9 or 10, wherein the diisocyanate is selected from the group consisting of tetramethylene diisocyanate, hexamethylene diisocyanate (HDI), dodecamethylene diisocyanate, 1,4-diisocyanato-cyclohexane, trimethylhexane diisocyanate, 2,2-bis(4-isocyanatocyclohexyl)-propane, isophorone diisocyanate (IPDI), 4,4'-dicyclohexylmethane diisocyanate (HMDI), 1,3-bis(2-isocyanato-2-propyl)benzene (TMXDI), toluene diisocyanate (TDI) and diphenylmethane diisocyanate (MDI), the diisocyanate preferably being 1,3-bis(2-isocyanato-2-propyl)benzene (TMXDI).
12. The process according to any of embodiments 9 to 11, wherein the weight ratio of diisocyanate relative to polycarbodiimide in the mixture obtained from (a) is in the range of from 1:100 to 1,000:100 preferably from 1:100 to 500:100, more preferably from 1:100 to 100:100.
13. The process according to any of embodiments 9 to 12, wherein the entrainer added in (c) is the diisocyanate further comprised in the mixture obtained from step (a).
14. The process according to any of embodiments 9 to 13, wherein in (c) the weight ratio of polycarbodiimide relative to added entrainer is in the range of from 10:100 to 1,000:100, preferably in the range of 20:100 to 500:100, more preferably in the range of 40:100 to 250:100, more preferably in the range of 100:100 to 250:100.
15. The process according to any of embodiments 1 to 14, wherein the distillation in (b) is performed at a temperature in the range of from 100 to 400° C., preferably from 130 to 350° C., more preferably from 150 to 250° C.
16. The process according to any of embodiments 1 to 15, wherein the distillation in (d) is performed at a temperature in the range of from 100 to 400° C., preferably from 130 to 350° C., more preferably from 150 to 250° C.
17. The process according to any of embodiments 1 to 16, wherein the distillation in (b) is performed at a pressure in the range of from 0.1 to 800 mbar, preferably from 0.1 to 500 mbar, more preferably from 0.1 to 300 mbar.
18. The process according to any of embodiments 1 to 17, wherein the distillation in (d) is performed at a pressure in the range of from 0.1 to 800 mbar, preferably from 0.1 to 500 mbar, more preferably from 0.1 to 300 mbar.
19. The process according to any of embodiments 1 to 18, wherein the first top product obtained from (b) comprising carbodiimidization catalyst and/or the second top product obtained from (d) comprising carbodiimidization catalyst is/are at least partially, preferably completely recycled as starting material for polymerizing the diisocyanate in the presence of the carbodiimidization catalyst according to step (a).
20. A composition containing a polycarbodiimide, a carbodiimidization catalyst, and optionally a diisocyanate, said composition preferably being obtainable or obtained by the process according to any of embodiments 1 to 19, wherein at least 99.99% by weight of said composition consist of the polycarbodiimide, the carbodiimidization catalyst and optionally the diisocyanate, and wherein in said composition, the weight ratio of the carbodiimidization catalyst relative to the polycarbodiimide is at most 0.2:100,000, preferably at most 0.15 to 100,000, more preferably at most 0.1:100,000.
21. The composition of embodiment 20, having a color index of at most 20, preferably of at most 10, more preferably of at most 5, as determined according to DIN 6162, wherein the polycarbodiimide comprised in the mixture has an NCO content in the range of from 0 to 25% by weight, preferably from 1 to 18% by weight, more preferably from 2 to 15% by weight, based on the total weight of the polycarbodiimide.
22. An integrated process for the preparation and purification of a polycarbodiimide, said process comprising
   (a) polymerizing a diisocyanate in the presence of a carbodiimidization catalyst in a reaction vessel in liquid phase at a temperature in the range of from 20 to 250° C., at a pressure in the range of from 20 to 800 mbar and in the presence of at least one inert gas, wherein the at least one inert gas is introduced into the liquid phase in the reaction vessel with a flow rate in the range of from 0.1 x/h to 100 x/h, x being the volume of the reaction vessel, to obtain a reaction mixture comprising a polycarbodiimide, a carbodiimidization catalyst and optionally a diisocyanate;
   (b) separating carbodiimidization catalyst from the polycarbodiimide by subjecting the mixture according to (a) to a first distillation, wherein a first bottom product and a first top product are obtained, wherein the first bottom product comprises the polycarbodiimide and carbodiimidization catalyst, wherein the weight ratio of carbodiimidization catalyst relative to polycarbodiimide in the first bottom product is lower than the weight ratio of carbodiimidization catalyst relative to polycarbodiimide in the mixture according to (a), and wherein the first top product comprises carbodiimidization catalyst and optionally diisocyanate;
   (c) adding an entrainer to the first bottom product obtained from (b) to obtain a mixture, wherein the entrainer has a boiling point which is lower than the boiling point of the polycarbodiimide, wherein the entrainer is the diisocyanate from which the polycarbodiimide is polymerized in (a);
   (d) further separating carbodiimidization catalyst from the polycarbodiimide by subjecting the mixture obtained from (c) to a second distillation, wherein a second bottom product and a second top product are obtained, wherein the second bottom product comprises the polycarbodiimide and carbodiimidization catalyst, wherein the weight ratio of carbodiimidization catalyst relative to polycarbodiimide in the second bottom product is lower than the weight ratio of carbodiimidization catalyst relative to polycarbodiimide in the first bottom product obtained from (b), and wherein the second top product comprises carbodiimidization catalyst and entrainer;
   (e) at least partially, preferably completely recycling the first top product obtained from (b) and/or the second top product obtained from (d) into (a) as starting material for polymerizing the diisocyanate in the presence of the carbodiimidization catalyst.
23. The integrated process of embodiment 22, wherein in (c), the entrainer added to the first bottom product obtained from (b) is the diisocyanate from which the polycarbodiimide is polymerized in (a).

Use of the Polycarbodiimide

If used as a stabilizer, it is preferred to increase the solubility and homogeneous distribution of the polycarbodiimides. Having a good compatibility with ester type resins, the polycarbodiimide may be easily added during the synthesis of the resin or during the processing of the resin. Depending of the nature of the resin, the polycarbodiimides may be covalently modified with hydrophilic or hydrophobic compounds. The hydrophilic or hydrophobic compounds react preferably via terminal NCO groups with the polycarbodiimide of the present invention.

The polycarbodiimide of the present invention may be preferably modified with a compound selected from the group consisting of monools, diols, polyoxyalkylene alcohols, monoamines, polyethylene glycols and polypropylene glycols.

It is also conceivable that the diisocyanate may be partly modified with these compounds first, followed by a polymerization of the modified diisocyanate in the presence of a carbodiimidization catalyst.

Suitable monools are selected from the groups consisting of methanol, ethanol, n-propanol, isopropanol, n-butanol, sec-butanol, n-pentanol, technical pentanol mixtures, n-hexanol, technical hexanol mixtures, 2-ethylhexanol, octanol, 2-ethyloctanol, decanol, dodecanol, cyclohexanol and benzyl alcohol, and mixtures of two or more thereof.

Suitable diols are selected from the group consisting of 1,2-ethanediol, 1,3-propanediol, 1,2-propanediol, 1,4-butanediol, 2,4-butanediol, 2,3-butanediol, 1,5-pentanediol, 1,6-hexanediol, 1,7-heptanediol, 1,8-octanediol, 1,10-decanediol, neopentylglycol, 2-methylpropanedi-1,3-ol, 2-ethylpentanedi-1,5-ol, 3-methylpentanedi-1,5-ol, and mixtures of two or more thereof.

Suitable polyoxyalkylene alcohols are preferably alkoxypolyoxyalkylene alcohols selected from the group consisting of polyoxybutylene alcohol, polyoxypropylene alcohol, polyoxypropylenepolyoxyethylene alcohol, polyoxyethylene alcohol and mixtures of two or more thereof, and which may contain a bonded methoxy, ethoxy, n- or isopropoxy or n-butoxy group as terminal alkoxy group.

Suitable monoamines are selected from the group consisting of methylamine, ethylamine, propylamine, butylamine, pentylamine, hexylamine, 1-ethylhexylamine, octylamine, decylamine, diethylamine, dipropylamine, dibutylamine, methylbutylamine, ethylbutylamine, ethylhexyamine, and mixtures of two or more thereof.

Suitable polyethylene glycols have a number average molecular weight (Mn) in the range of from 200 to 6,000 g/mol, more preferable of 400 to 5,000 g/mol, more preferably of from 400 to 3,000 g/mol, more preferably of from 400 to 2,000 g/mol. Suitable polypropylene glycols have a number average molecular weight (Mn) in the range of from 200 to 6,000 g/mol, more preferable of 400 to 5,000 g/mol, more preferably of from 400 to 3,000 g/mol, more preferably of from 400 to 1,000 g/mol.

The polycarbodiimides of the present invention are particularly useful as stabilizers for ester comprising polymers such as thermoplastic polyesters such as polyethylenetereph-thalates, polybutylentherephthalates, polyetheresters, polyesteramides, polycaprolactones and unsaturated polyesterresins and polyesteresters, such as blockcopolymers of polyethyleneterephthalates or polybutyleneterephthalates, or for polymers comprising polyamides.

In cases where the polycarbodiimide used as a crosslinking agent for a resin, the polycarbodiimide is favorably modified with a compound comprising at least one double bond, preferably at least one olefinic double bond. Preferably, a compound comprising at least one double bond and a functional group capable of reacting with terminal NCO groups is used to further modify the polycarbodiimide.

Specific compounds comprising at least one double bond and a functional group capable of reacting with terminal NCO groups are selected from the group consisting of 2-hydroxyethyl acrylate, 2-hydroxyethyl methacrylate, 2-hydroxypropyl acrylate, 2-hydroxypropyl methacrylate, pentaerythritol triacrylate, pentaerythritol trimethyacrylate, allyl alcohol, 3-butene-1-ol, 4-pentene-1-ol, allylamine, N-methylally-lamine, N-ethyl-2-methylallylamine, diallylamine, allylcyclohexylamine, 2-allylphenol, 2-allyloxyethanol, pentaerythritol triallyl ether, polyethylene glycol monomethacrylate, polypropylene glycol monomethacrylate, polyethylene glycol monoacrylate, 2-hydroxy-1,3-dimethacryloxypropane, polypropylene glycol monoacrylate and the like.

Thus, the polycarbodiimides of the present invention may be favorably used as cross-linkers in water soluble polymers. The polycarbodiimide obtained by the process of the present invention may be added to a resin having a group capable of reacting with polycarbodiimide, for example, an acrylic resin or natural rubber or synthetic rubber supplied in a form of emulsion (latex) to cross-link the resin and confer further stability to the resin.

It is understood that the polycarbodiimides of the present invention modified with a compound with cross-linking ability may be act as hydrolysis stabilizers as well. Advantageously, by forming a covalent bond with the resin, bleeding out of the resin is prevented, thereby enhancing the stabilizing performance and keeping the required amounts of polycarbodiimide low. It is understood that high amounts of polycarbodiimides function as plasticizer and the original performance of the resin is thereby deteriorated.

The concentration of the polycarbodiimides of the invention in the polymers to be stabilized or cross-linked is in the range of from 0.05 to 10% by weight, preferably in the range of 0.1 to 5% by weight.

The polycarbodiimides of the present invention show an excellent reactivity towards carboxylic groups and are preferably used as stabilizers to prevent the hydrolysis of compounds comprising ester moieties. The polycarbodiimides show a good dispersibility in ester group comprising polymers have further a low color index which does not influence negatively the outer appearance of resins. Further, the polycarbodiimide obtained by the process of the present invention has favorably a high degree of purity, thereby not altering unfavorably the original dynamic and static properties of plastics over long periods of time.

The present invention is illustrated by the following examples and comparative examples.

EXAMPLES

Examples 1 to 11

The experiments were carried out in a 1000 ml four-necked flask equipped with stirrer and reflux condenser. The inert gas (technical nitrogen) was introduced via a steel tube having an inner diameter of 3 mm. The outlet opening of the steel tube was positioned, at the beginning of the reaction, in the middle between the flask bottom and the liquid level so that the gas stream was introduced during the complete reaction time below the liquid level. The temperature of the introduced inert gas was 23° C., and the inert gas was introduced at a pressure of 1 bar. The amount of introduced inert gas was controlled via a rotameter.

The amounts of inert gas of examples 1 to 11 given in Table 1 hereinunder were introduced into a solvent-free mixture of 500 g TMXDI and 1.2 g MPO which was heated. When the temperature indicated in Table 1 had been reached, a vacuum of 300 mbar was additionally applied. Vacuum was generated with a rotary vane pump connected at the upper opening of the condenser.

The reaction progress was monitored via the measurement of the NCO content of the reaction mixture. The NCO content in % by weight of the reaction mixture was determined by standard titration according to DIN EN 1242. The reaction was terminated when the NCO-content was about 10% by weight.

Comparative Example 1

The reaction was performed as described for Examples 1 to 11, except that the reaction mixture was only purged with 10 l/h N2 during heating. When the temperature indicated in Table 1 was reached, the N2-stream was turned off and the vacuum of 300 mbar was applied for the rest of the reaction time.

Comparative Example 2

The reaction was performed as described for Examples 1 to 11, except that the nitrogen stream was introduced throughout the reaction above the liquid level.

Comparative Example 3

The reaction was performed as described for Examples 1 to 11, except that no vacuum was applied.

For the polycarbodiimide of Examples 6 to 11 and for Comparative Example 1, the color index was determined according to DIN 6162.

The results of the Examples and the Comparative Examples are summarized in Table 1.

TABLE 1

Results of the Examples and the Comparative Examples

| Experiment No. | Temperature (° C.) | Pressure (mbar) | $N_2$-Stream (l/h) | $N_2$-Stream (introduced above/below liquid level) | Final NCO-content (weight-%) | Reaction time until final NCO-content (h) | Color index |
|---|---|---|---|---|---|---|---|
| 1 | 150 | 300 | 1 | b *) | 8.7 | 28.5 | n.d. ***) |
| 2 | 150 | 300 | 2 | b | 11.8 | 20.0 | n.d. |
| 3 | 150 | 300 | 5 | b | 11.3 | 16.5 | n.d. |
| 4 | 150 | 300 | 10 | b | 10.6 | 14.0 | n.d. |
| 5 | 150 | 300 | 20 | b | 11.3 | 20.5 | n.d. |
| 6 | 160 | 300 | 10 | b | 10.8 | 11.5 | 3.5 |
| 7 | 170 | 300 | 10 | b | 9.7 | 8.0 | 4.5 |
| 8 | 180 | 300 | 10 | b | 8.1 | 5.7 | 9.2 |
| 9 | 190 | 300 | 10 | b | 9.9 | 3.5 | 15.9 |
| 10 | 150 | 300 | 0.1 | b | 10.8 | 34.3 | 35.1 |
| 11 | 150 | 300 | 40 | b | 11.3 | 20.4 | 5.2 |
| Comp. Ex. 1 | 150 | 300 | — | — | 10.9 | 35.5 | 37.2 |
| Comp. Ex. 2 | 150 | 300 | 10 | a **) | 9.9 | 26 | n.d. |
| Comp. Ex. 3 | 150 | 1000 | 10 | b | 9.2 | 30 | n.d. |

*) below liquid level
**) above liquid level
***) not determined

The present examples clearly show the advantageous effects of the process of the present invention. When performed at elevated temperatures, at a reduced pressure and further in a stream of inert gas which is introduced into the reaction mixture below liquid level, the desired NCO content of about 10% by weight is obtained particularly fast. In particular, comparing comparative example 3 with the examples 1 to 5 and 10 and 11, it is shown that using the stream of inert gas leads to a decrease in reaction time.

Further, comparing comparative example 2 with example 4, it is shown that introducing the stream of inert gas below the liquid level instead of above liquid level leads to a significant decrease in reaction time. Yet further, comparing comparative example 3 with example 4, it is shown that when introducing the stream of inert gas below the liquid level, the reduced pressure leads to a significant decrease in reaction time.

Further, the results show the positive effect of the introduction of a stream of inert gas into the reaction mixture on the color index of the obtained polycarbodiimide. Particularly, the polycarbodiimides in the examples show a low color index. The polycarbodiimide obtained in the absence of a nitrogen stream during the reaction, however, has an unfavorable value of 37.2 (comparative example 1).

CITED LITERATURE

EP-A 2 371 873
EP-A 0 952 146
EP-A 0 548 815
EP-A 0 767 188
EP-A 0 789 059
EP-A 0 808 828

The invention claimed is:

1. A process for producing a polycarbodiimide, the process comprising:
   (a) polymerizing a diisocyanate in the presence of a carbodiimidization catalyst in a reaction vessel in liquid phase at a temperature in the range of from 20 to 250° C., at a pressure in the range of from 20 to 800 mbar and in the presence of at least one inert gas, wherein the at least one inert gas is introduced into the liquid phase in the reaction vessel with a flow rate in the range of from 1 x/h to 20 x/h, x being the volume of the reaction vessel, and wherein the at least one inert gas is selected from the group consisting of nitrogen, helium, neon, argon, and a mixture of two or more thereof.

2. The process according to claim 1, wherein the diisocyanate is polymerized at a temperature in the range of from 130 to 200° C.

3. The process according to claim 1, wherein the diisocyanate is polymerized at a pressure in the range of from 200 to 500 mbar.

4. The process according to claim 1, wherein the diisocyanate has formula $R(NCO)_2$, wherein R is selected from the group consisting of a linear or branched aliphatic $C_3$-$C_{15}$ hydrocarbon residue, a cycloaliphatic $C_5$-$C_{20}$ hydrocarbon residue, an aryl $C_6$-$C_{18}$ hydrocarbon residue, an alkaryl $C_6$-$C_{20}$ hydrocarbon residue, and an aralkyl $C_6$-$C_{20}$ hydrocarbon residue.

5. The process according to claim 1, wherein the diisocyanate is selected from the group consisting of tetramethylene diisocyanate, hexamethylene diisocyanate (HDI), dodecamethylene diisocyanate, 1,4-diisocyanatocyclohexane, trimethylhexane diisocyanate, 2,2-bis(4-isocyanatocyclohexyl)-propane, isophorone diisocyanate (IPDI), 4,4'-dicyclohexylmethane diisocyanate (HMDI), 1,3-bis(2-isocyanato-2-propyl)benzene (TMXDI), toluene diisocyanate (TDI) and diphenylmethane diisocyanate (MDI).

6. The process according to claim 1, wherein the diisocyanate is 1,3-bis(2-isocyanato-2-propyl)benzene (TMXDI).

7. The process according to claim 1, wherein at the beginning of said polymerizing, the carbodiimidization catalyst is present, relative to the diisocyanate, in an amount in the range of from 100 to 20,000 wppm.

8. The process according to claim 1, wherein the carbodiimidization catalyst comprises an organophosphorous compound selected from the group consisting of a phospholene, a phospholene oxide, a phospholidine, a phospholine oxide and a mixture of two or more thereof.

9. The process according to claim 1, wherein the carbodiimidization catalyst comprises 1-methyl-2-phospholene-1-oxide (MPO).

10. The process according to claim 1, wherein the inert gas is nitrogen.

11. The process according to claim 1, wherein the diisocyanate is polymerized in the absence of a solvent.

12. The process according to claim 1, wherein the polycarbodiimide obtained from (a) has a degree of polymerization in the range of from 1 to 20.

13. The process according to claim 1, wherein the polycarbodiimide obtained from (a) has an NCO content in the range of from 0 to 25% by weight based on a total weight of the polycarbodiimide.

14. The process according to claim 13, wherein the NCO content is achieved after a polymerization time in the range of from 1 to 30 hours.

15. The process according to claim 1, wherein the polycarbodiimide obtained from (a) has a color index of at most 20 as determined according to DIN 6162.

16. The process according to claim 1, further comprising:
(b) separating the carbodiimidization catalyst from the polycarbodiimide by subjecting a reaction mixture obtained from (a) to a first distillation, wherein a first bottom product and a first top product are obtained, wherein the first bottom product comprises the polycarbodiimide and the carbodiimidization catalyst, wherein a weight ratio of the carbodiimidization catalyst relative to the polycarbodiimide in the first bottom product is lower than a weight ratio of the carbodiimidization catalyst relative to the polycarbodiimide in the mixture according to (a), and wherein the first top product comprises the carbodiimidization catalyst;
(c) adding an entrainer to the first bottom product obtained from (b) to obtain a mixture, wherein the entrainer has a boiling point which is lower than a boiling point of the polycarbodiimide;
(d) further separating the carbodiimidization catalyst from the polycarbodiimide by subjecting the mixture obtained from (c) to a second distillation, wherein a second bottom product and a second top product are obtained, wherein the second bottom product comprises the polycarbodiimide and the carbodiimidization catalyst, wherein a weight ratio of the carbodiimidization catalyst relative to the polycarbodiimide in the second bottom product is lower than a weight ratio of the carbodiimidization catalyst relative to the polycarbodiimide in the first bottom product obtained from (b), and wherein the second top product comprises the carbodiimidization catalyst and the entrainer;
(e) optionally at least partially recycling the first top product obtained from (b) and/or the second top product obtained from (d) into (a) as starting material for polymerizing the diisocyanate in the presence of the carbodiimidization catalyst.

17. The process according to claim 1, wherein the polycarbodiimide is further reacted with a compound selected from the group consisting of a monool, a diol, a polyoxyalkylene alcohol, a monoamine, a polyethylene glycol, and a polypropylene glycol.

* * * * *